United States Patent [19]

Hauser

[11] 4,019,586
[45] Apr. 26, 1977

[54] SHIFT DOG FOR TRANSMISSION
[75] Inventor: Hans Hauser, Fredericktown, Ohio
[73] Assignee: The J. B. Foote Foundry Co., Fredericktown, Ohio
[22] Filed: Sept. 19, 1975
[21] Appl. No.: 614,908
[52] U.S. Cl. .................. 192/48.91; 192/67 P; 74/337.5
[51] Int. Cl.² ..................... F16D 11/10
[58] Field of Search ......... 192/67 R, 67 P, 48.91; 74/337.5

[56] References Cited
UNITED STATES PATENTS

| | | | |
|---|---|---|---|
| 918,610 | 4/1909 | Tschantz | 192/67 P |
| 1,208,746 | 12/1916 | Cavanagh | 192/67 P |
| 1,618,470 | 2/1927 | Patterson | 192/67 R |
| 1,677,705 | 7/1928 | Carling | 192/67 R |
| 2,220,463 | 11/1940 | Sinclair | 192/67 R |
| 2,791,131 | 5/1957 | Boughner | 192/48.91 X |
| 3,799,002 | 3/1974 | Richards | 192/48.91 X |

FOREIGN PATENTS OR APPLICATIONS

| | | | |
|---|---|---|---|
| 59,326 | 1/1954 | France | 192/67 R |
| 294,029 | 3/1971 | U.S.S.R. | 192/67 P |

Primary Examiner—Allan D. Herrmann
Attorney, Agent, or Firm—Allen D. Gutchess, Jr.

[57] ABSTRACT

A shift dog for an in-line transmission is provided to engage and disengage rotatable members or gears in the transmission. The shift dog has resiliently-mounted teeth which can yield if the teeth are not properly aligned with recesses in the gear when the dog is attempted to be moved into engagement therewith. The transmission can then be shifted through that gear to another position, and particularly to neutral, even though the dog and gear are not aligned for engagement.

7 Claims, 3 Drawing Figures

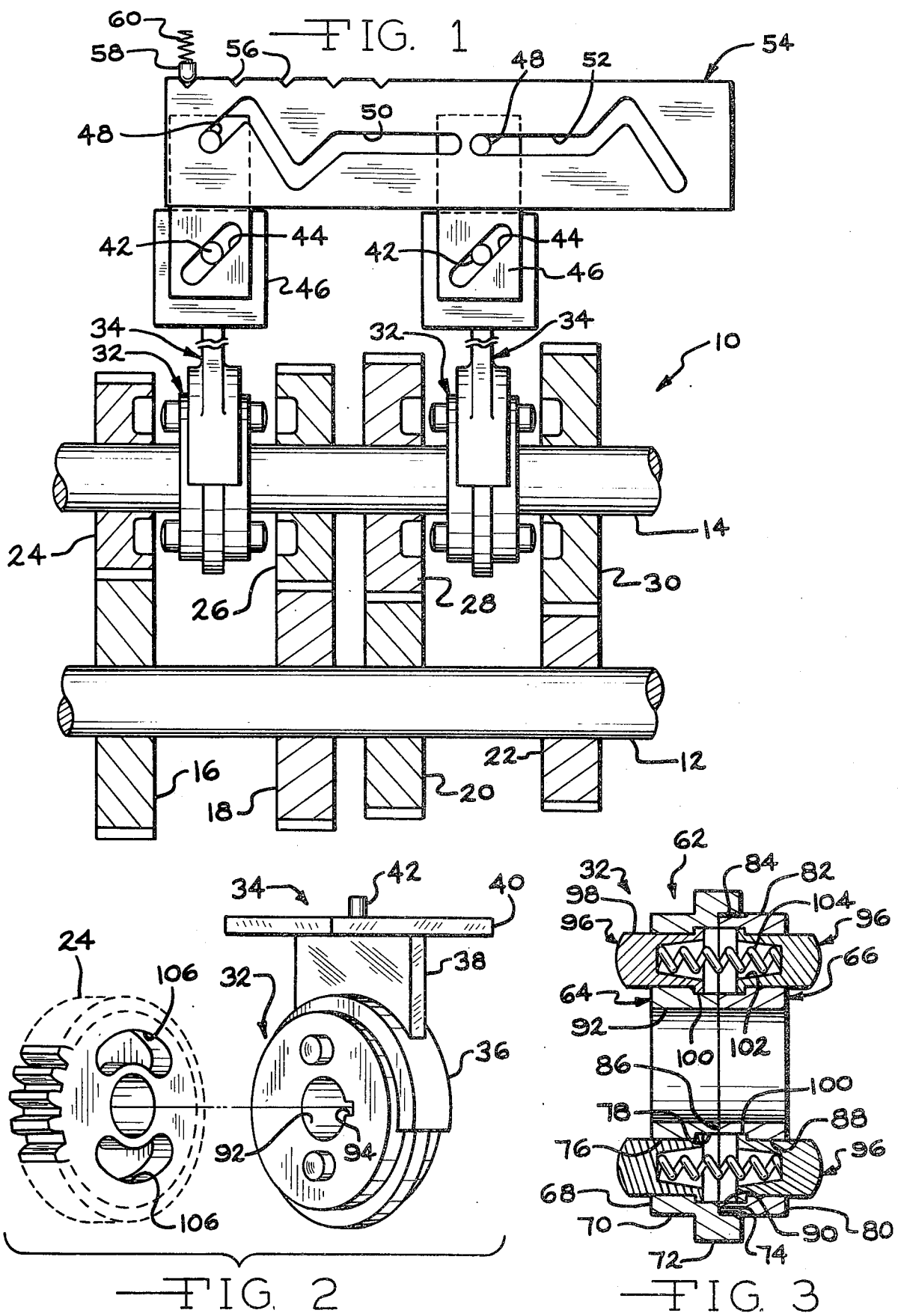

SHIFT DOG FOR TRANSMISSION

This invention relates to a transmission and more particularly to a shift dog for an in-line transmission.

An in-line transmission commonly has a plurality of forward speeds, neutral, and at least one reverse speed. When shifting from any position not immediately adjacent the neutral position back to neutral, it is necessary to shift through other gear positions. For example, if a five-speed transmission is in the fourth forward speed, the transmission must be shifted through the third, second, and first forward speeds to reach neutral.

It is now common for riding lawn mowers and similar vehicles to be equipped with a safety system so that the engine cannot be started unless the transmission is in the neutral position. Consequently, if such a vehicle with an in-line transmission stalls or the engine is shut off in any position other than neutral, it is necessary to shift the transmission back to neutral in order to restart the engine. However, to shift back to neutral, the shift or clutch dogs within the transmission must be engaged with and disengaged from their respective gears as the shift lever is moved back to neutral. If the teeth or other engageable members on the shift dogs are not aligned with the engageable members or recesses on the respective gears, such shifting cannot be effected. In such an instance, it is necessary for an operator to rock the vehicle in order to move the gears to provide the necessary alignment of the engageable members so that the transmission can be shifted through the intervening gears back to neutral.

The present invention provides a shift or clutch dog particularly for an in-line transmission which has resiliently- or yieldably-mounted teeth or engageable members therein. With this dog, the teeth will yield as the dog is moved toward the engageable position with the respective gear if the teeth are not aligned with the recesses in the gear. Consequently, the transmission can be shifted through that particular position back toward neutral whether or not the particular dog and gear are in proper alignment. By way of a specific example, if the engine should stall with the transmission in the second forward speed position, it can be shifted back through the first forward speed position to neutral even if the teeth of the shift dog and the recesses of the first forward speed gear are not in alignment at the time of stalling. Thus, the transmission can be readily returned to neutral at any time, with or without proper alignment of the dogs and gears. The transmission can also be readily shifted from neutral into a gear position and without double clutching.

The specific clutch dog in accordance with the invention includes a two-part casing carrying clutch teeth extending in opposite directions from the faces of the casing. Coil springs are located in the casing between the teeth to urge both of them outwardly. The two parts of the casing can be assembled by a press fit after the teeth and springs are assembled therewith. This provides an inexpensive yet effective and reliable design for the new shift dog.

It is, therefore, a principal object of the invention to provide a shift dog with resiliently-mounted teeth.

Another object of the invention is to provide a shift dog particularly for an in-line transmission which enables the transmission to be shifted back toward neutral even if the shift dog is not properly aligned with its respective gear.

A further object of the invention is to provide a shift dog for a transmission which is relatively low in cost and yet reliable in operation.

Many other objects of the invention will be apparent from the following detailed description of a preferred embodiment thereof, reference being made to the accompanying drawings, in which:

FIG. 1 is a schematic view of an in-line transmission employing shift dogs according to the invention;

FIG. 2 is an exploded view in perspective of a shift dog, a shifter fork, and a gear engageable by the shift dog; and FIG. 3 is a view in vertical cross section taken centrally through the shift dog.

Referring to FIG. 1, an in-line transmission is schematically illustrated at 10, with the housing being omitted. The transmission 10 is shown only as having four forward speed positions solely by way of illustration. The transmission includes a drive shaft 12 and a driven shaft 14, with four gears 16, 18, 20, and 22 being suitably affixed to the drive shaft 12. These, in turn, are constantly in mesh with four driven gears 24, 26, 28, and 30 which are rotatably mounted on the drive shaft 14.

Two shift or clutch dogs 32 embodying the invention are suitably keyed to the driven shaft 14 for slidable but nonrotatable movement with respect thereto. As shown, the transmission is in neutral with both of the shift dogs 32 being out of engagement with the driven gears 24–30.

The shift dogs are moved longitudinally of the shaft 14 through shifter forks 34. The shifter forks 34 can be of any suitable design with each, as shown particularly in FIG. 2, including a yoke 36 engageable with the clutch dog, a leg or stem 38, and a plate 40 having a pin or projection 42 extending upwardly therefrom. The pins 42 extend through diagonal slots 44 (FIG. 1) of transfer plates 46. The plates 46, in turn, have upwardly-extending pins 48 which are received in specially-shaped grooves or slots 50 and 52 of a cam member or slide 54. The slide is moved longitudinally, parallel to the shaft 14, by a suitable shift lever or mechanism (not shown) with neutral and four forward speed positions of the slide being indicated by notches 56, a detent 58, and a spring 60. As the slide 54 moves longitudinally, it moves the transfer plates 46 transversely to the direction of movement of the slide and accordingly moves the shifter forks 34 longitudinally of the driven shaft 14. Suitable guides (not shown) are employed for the slide 54, the plates 46, and the forks 34 to limit their movements to the aforesaid directions. A shift arrangement of this type is shown and described more fully in Hauser U.S. Pat. No. 3,426,611, issued on Feb. 11, 1969, and will not be discussed in more detail. In that patent, the shifter forks are moved transversely to the direction of movement of the slide whereas in the instant illustration, the shifter forks are moved in the same direction as the slide. This is the reason the transfer plates 46 are necessary.

As the slide 54 is moved longitudinally, the left-hand shift dog 32 engages the first forward speed gear 24 and then the second forward speed gear 26, with the right-hand shift dog 32 remaining in the neutral position at this time. Further movement of the slide 54 then moves the left-hand shift dog 32 back to neutral with the right-hand shift dog then engaging the third forward speed gear 28 and, finally, the fourth forward speed gear 30. With conventional clutch dogs heretofore known, it will be readily understood that if the clutch dog teeth or other engageable members are not in alignment with the recesses or other engageable members of the gears, the shift cannot be effected until the teeth and recesses are properly aligned.

Referring particularly to FIGS. 2 and 3, the shift dog 32 according to the invention includes a casing or body 62 made of two mating parts 64 and 66. The part 64 has a planar circular face 68 with an outer cylindrical surface 70 and an annular ridge 72. The part 64 also forms a cylindrical shallow recess 74 with two openings 76 communicating with the faces 68 and two larger openings 78 communicating with the recess 74.

The annular ridge 72 of the dog casing 62 is received in an arcuate recess or groove in the shifter fork yoke 36. This is opposite the usual design in which a shifter fork yoke is received in a groove in the dog casing because such a groove might otherwise tend to interfere with the resiliently-mounted teeth and require a larger diameter for the dog 32.

The part 66 also has a planar circular face 80 with an outer cylindrical surface 82 of substantially the same diameter as the shallow recess 74. The part 66 further has shallow ribs 84 adjacent an inner face 86 which extends into the recess 74 when assembled therewith. The ribs 84 enable the two parts to be assembled by a press fit and to be in secure mating relationship. The part 66 also has two openings 88 communicating with the face 80 and two larger openings 90 communicating with the inner face 86. Both of the parts 64 and 66 also have central openings 92 to be received on the driven shaft 14 and keyways 94 to receive a key which is also engaged with the shaft 14 to enable the clutch dog to move longitudinally of the shaft 14, but not to rotate with respect thereto.

Engageable members in the form of projections or teeth 96 are carried by each of the shift dog casing parts 64 and 66 with outer portions 98 located in the openings 76 and 88 and with enlarged shoulder portions 100 located in the larger openings 78 and 90. The teeth 96 also have central recesses 102 facing one another and receiving resilient means in the form of a coil spring 104 in this instance, which is located in a cavity formed by the enlarged openings 78 and 90.

Referring to FIG. 2, when the shift dog 32 is moved into engagement with the gear 24, the teeth 96 move into arcuate recesses or engageable means 106 to cause the gear 24 to rotate the shift dog 32 and consequently drive the shaft 14.

With in-line designs heretofore known, if the transmission were in gear when the entire were stopped, with the teeth 96 out of alignment with recesses 106, it would not be possible to shift the transmission back to neutral from any position beyond the first forward speed, in this instance. To accomplish this, it would be necessary to rock the mower or other vehicle in order to cause the shaft 12 to oscillate and accordingly move the gear 24 through the gear 16 until alignment of the dog teeth 96 and the recesses 106 resulted. However, with the shift dog 32 according to the invention, if the teeth 96 and the recesses 106 are not aligned, the teeth 96 will engage the face of the gear and simply be pushed in until the teeth are substantially in coplanar relationship with the face 68 of the dog. Shifting of the transmission back to neutral with the engine stalled can then be easily accomplished whether or not alignment of the engageable members of the dog and gear is achieved.

When the teeth are recessed to the coplanar relationship with the dog face, the shoulder ends of the teeth are moved back substantially against the shoulders of the opposite teeth so that the enlarged openings 78 and 90 need not have a depth equal to the extent of the projection of the teeth 96 beyond the dog faces when in their outer positions. This enables the overall thickness of the dog casing 62 to be less than otherwise required.

It will be readily understood that various other shapes of the teeth 96 can be employed and that the engageable means for the gears 24–30 can take various other forms, such as outwardly-extending teeth with notches therebetween which receive the teeth 96.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A shift dog for an in-line transmission, said dog comprising a casing of generally cylindrical shape with a generally cylindrical outer wall and two circular end faces, said cylindrical outer wall having a configuration to be engaged by a shifter fork, each of said end faces having at least one opening therein opposite one another and communicating with a larger common cavity within said casing, a projection in each of said openings and having an outer position in which the projection extends outwardly beyond the respective end face and an inner position in which the projection is substantially entirely behind the respective end face, each of said projections having means for preventing movement thereof beyond their outer positions, said cavity having a depth such that the distance between the projections when in their outer positions at least equals the extent to which said projections extend beyond the end faces when in the outer positions, each of said projections having a recess facing toward one another in said common cavity, and resilient means in said cavity with end portions received in said recesses for urging said projections toward their outer positions.

2. A shift dog according to claim 1 characterized by said cylindrical wall having an annular ridge which receives the shifter fork.

3. A shift dog according to claim 1 characterized by said resilient means being a coil spring having ends received in said recesses.

4. A shift dog according to claim 1 characterized by said casing comprising two separate mating parts, each of which forms one of said openings and a portion of said common cavity.

5. An in-line transmission comprising a shaft, a shift dog comprising a casing having a central passage receiving said shaft for slidable, but non-rotatable movement with respect thereto, said casing being of generally cylindrical shape with an outer wall and two circular end faces, said outer wall having means to cooperate with a shifter fork to enable slidable movement of said shift dog relative to said shaft, each of said end faces having at least one opening therein communicating with a larger common cavity within said casing, said openings being opposite one another, a projection in each of said openings and having an outer position in which the projection extends outwardly beyond the respective end face and another position in which the projection is substantially entirely behind the respective end face, said common cavity having a depth such that the distance between said projections, when in their outer positions, at least equals the extent to which said projections extend beyond the end faces when in the outer positions, common resilient means in said cavity urging said projections toward their outer positions, a driven member rotatably mounted on said shaft on each side of said shift dog, each of said driven members having an annular face facing toward said shift dog and each of said annular faces having at least one arcuate recess therein positioned to receive the corresponding projection of said shift dog when the corresponding adjacent end face of said shift dog is moved into substantially contiguous relationship with the annular face of the driven member and the corresponding arcuate recess and projection are aligned.

6. A transmission according to claim 5 characterized by each of said projections having a recess facing toward said common cavity, and said resilient means being a coil spring having ends received in said recesses of said projections.

7. A shift dog according to claim 5 characterized by said casing comprising two separate mating parts, each of which forms one of said openings and a portion of said common cavity.

* * * * *

UNITED STATES PATENT OFFICE
CERTIFICATE OF CORRECTION

PATENT NO. : 4,019,586
DATED : April 26, 1977
INVENTOR(S) : Hans Hauser

It is certified that error appears in the above-identified patent and that said Letters Patent are hereby corrected as shown below:

Column 3, line 51, for "entire" substitute --engine--.

Signed and Sealed this nineteenth Day of July 1977

[SEAL]

Attest:

RUTH C. MASON
*Attesting Officer*

C. MARSHALL DANN
*Commissioner of Patents and Trademarks*